United States Patent [19]

Cooper et al.

[11] 4,039,341

[45] Aug. 2, 1977

[54] PRODUCTION OF CARBON ARTICLES

[75] Inventors: George Anthony Cooper, Brussels, Belgium; Rayner Michael Mayer, Pretoria, South Africa; William Watt, Farnborough, England

[73] Assignee: National Research Development Corporation, London, England

[21] Appl. No.: 389,027

[22] Filed: Aug. 16, 1973

Related U.S. Application Data

[63] Continuation of Ser. No. 115,873, Feb. 16, 1971, abandoned.

[30] Foreign Application Priority Data

Feb. 23, 1970 United Kingdom ............... 8532/70
Aug. 17, 1970 United Kingdom ............. 39541/70

[51] Int. Cl.$^2$ .................... C01B 31/02; C04B 35/52
[52] U.S. Cl. .................................. 106/56; 264/29.1;
423/445; 423/447.6; 423/449; 428/404
[58] Field of Search ..................... 423/445, 447–449;
264/29, 29.1; 260/37; 117/4, 46 CC, 46 CB, 115; 106/56

[56] References Cited

U.S. PATENT DOCUMENTS

| 2,721,820 | 4/1940 | Reis et al. ...................... 117/46 CC |
| 3,367,812 | 2/1968 | Watts ................................ 264/29 X |
| 3,541,582 | 11/1970 | Johnson et al. ..................... 423/447 |
| 3,579,401 | 5/1971 | Cauville et al. ................ 423/447 X |
| 3,720,575 | 3/1973 | Cowlard .......................... 264/29 X |
| 3,728,423 | 4/1973 | Shaffer ................................ 264/29 |
| 3,790,393 | 2/1974 | Cowlard et al. ...................... 106/56 |

Primary Examiner—Edward J. Meros
Attorney, Agent, or Firm—Larson, Taylor and Hinds

[57] ABSTRACT

A process for the production of a carbon article is provided by which a synthetic organic fibre which is capable of conversion to high strength, high modulus carbon fibre and which has been partially so converted is impregnated with a synthetic organic resin and the resin/fibre impregnate subject to a carbonization treatment in an inert atmosphere at a temperature of at least 1000° C. Preferably the fibre is polyacrylonitrile which has been heated at a temperature of 200° to 250° C in an oxidizing atmosphere. The resin may be a phenol/formaldehyde resin, a polyvinylidene chloride resin or a polyfurfuryl alcohol resin. The process is particularly suited to the production of carbon articles in the form of fibre or rod by drawing the fibre first through the resin to impregnate it and then through a die to form the resin/fibre impregnate.

12 Claims, No Drawings

PRODUCTION OF CARBON ARTICLES

This is a continuation of application Ser. No. 115,873 filed Feb. 16, 1971, now abandoned.

The present invention is concerned with carbon articles and with processes for their production.

It is known that synthetic resins may be strengthened by the inclusion of reinforcing fibres, for example, glass fibres, asbestos or high strength, high modulus carbon fibers such as are described in United Kingdom Patent Specification No. 1,110,791.

Similarly it is known to produce carbon articles by the carbonisation of synthetic resins, e.g. phenol-formaldehyde resin, polyvinylidene chloride or polyfurfuryl alcohol and accordingly it would be expected that reinforced carbon articles could be readily produced by the carbonisation of such resins reinforced by the above mentioned carbon fibres. However, bulk resins subjected to elevated temperatures to convert them to carbon articles undergo large shrinkages, of the order of 15 to 30% in length and the large differential shrinkage between the resin and the carbon fibre reinforcement can lead to extensive cracking of the carbon article produced.

Certain processes within the scope of the present invention may permit the substantial overcoming of the aforementioned difficulty.

In accordance with the present invention a process for the production of a carbon article includes the steps of impregnating with a synthetic organic resin a polyacrylonitrile fibre which is capable of conversion to high strength, high modulus carbon fibre, the said polyacrylonitrile fibre having previously been subjected to heat treatment at a temperature of the order of 200°–250° C in an oxidising atmosphere while being at least substantially restrained from shrinking and subjecting the synthetic organic resin/fibre impregate to carbonisation at a temperature at least in the region of 1000° C.

The carbon article, the product of the process of the present invention may be a bulk carbon article, in which case the fibre into which the synthetic organic resin is impregnated may be continuous tows or yarns, chopped lengths in the form of a felt, or a woven fabric or tape, or it may be a fibre or rod, in which case the fibre into which the synthetic organic fibre is impregnated is in the form of continuous tow or yarns.

In accordance with an aspect of the present invention a process for the production of a carbon article in the form of fibre or rod comprises impregnating with a synthetic organic resin a tow of polyacrylonitrile fibre which is capable of conversion to high strength, high modulus fibre, the said polyacrylonitrile fibre having previously been subjected to heat treatment at a temperature of the order of 200°–250° C in an oxidising atmosphere while being at least substantially restrained from shrinking, forming the synthetic organic resin/fibre impregnate as a rod or fibre and subjecting the said impregnate to a carbonisation step at a temperature at least in the region of 1000° C.

The diameter of rod or fibre produced by the process of the present invention will vary depending upon the number of ends of fibre included in the tow impregnated with resin and upon the amount of impregating resin used, but will generally be within the range of from 25 microns to 1 mm and preferably in the range 100 to 500 microns. The rod or fibre produced by the process of the present invention may be of any convenient cross-section, for example, circular, triangular or hexagonal, obtained, for example, by drawing the impregnated tows through an appropriately shaped die before or during curing of the resin but before carbonisation. The rod or fibre produced by the process of the present invention may be used as reinforcement in synthetic organic resin composites or metal composites and such composites have the advantage that since the reinforcing rods or fibres are of relatively thick cross-section, surface interactions between the reinforcement and the resin will play a correspondingly smaller part in the properties of the composite.

Advantageously the synthetic organic fibre may be polyacrylonitrile which has been subjected to heat treatment at a temperature of the order of 200°–250° C in a oxidising atmosphere while being at least substantially restrained from shrinking. Optionally the partial conversion of the polyacrylonitrile may include a further heat treatment in an inert atmosphere at a temperature of the order of 400° C or even up to of the order of 1000° C.

The term polyacrylonitrile as used in the present specification includes within its scope copolymers or terpolymers of acrylonitrile with not more than 10% by weight of other monomers, e.g. methyl methacrylate or vinyl acetate, either alone or to which have been added polymers compatible with them.

The synthetic organic resin may be any of the conventional synthetic resins, or a mixture thereof but is preferably a phenol/formaldehyde resin, polyvinylidene chloride, a furane resin, e.g. polyfurfuryl alcohol, while polyurethanes or Friedel Crafts resins may be used.

By Friedel Crafts resin is meant the product of a condensation reaction between an aromatic compound having at least two halogenomethyl (preferably methoxymethyl) groups attached directly to an aromatic nucleus and an aromatic compound having at least two nuclear hydrogen atoms available for and activated towards such condensation reaction, as disclosed in British patent specification Nos. 1,024,222 and 1,094,181.

The partially treated synthetic organic fibres employed in the processes of the present invention shrink during the carbonisation step of the process and therefore the differential shrinkage between the fibre and the resin is not so great as with fully carbonised carbon fibre and in accordance with an important aspect of the present invention a process for the production of a carbon article comprises impregnating with a synthetic organic resin a polyacrylonitrile fibre which is capable of conversion to high strength, high modulus carbon fibre, said polyacrylonitrile fibre having previously been subjected to heat treatment at a temperature of the order of 200°–250° C in an oxidising atmosphere while being at least substantially restrained from shrinking, and subjecting the synthetic organic resin/fibre impregnate to a carbonisation step at a temperature of the order of 1000° C, the synthetic organic resin and the synthetic organic fibre and the fibre's partial conversion treatment being selected so that cracking of the carbon article during the carbonisation step is substantially prevented.

The partial conversion treatment undergone by the synthetic organic fibre prior to impregnation with the synthetic organic resin determines the degree of shrinkage undergone by the said partially converted fibre during the carbonisation process. For example, Polyacrylonitrile fibre which has been partially converted by oxidation at temperatures of the order of 200°-250° C will shrink more than polyacrylonitrile which has been subjected to further heat treatment. This in turn will affect the shrinkage differential between the synthetic resin and the pre-treated fibre during the carbonisation step and therefore the properties of the carbon article produced.

It is not essential to select the fibre, resin and partial conversion treatment so that the shrinkage differential is nil, indeed it may be advantageous to allow a certain shrinkage differential.

For example unoxidised polyacrylonitrile fibre which has been partially converted by heating at 220° C for 5 hours in an oxidising atmosphere while restrained from shrinking, shrinks by about 13% in length on carbonisation. Reduction of the oxidation time results in partially converted fibre with larger linear shrinkages on carbonisation enabling the shrinkage of the resin to be matched.

Different synthetic resins vary in the amount of shrinkage that they undergo on carbonisation to a carbon article and the shrinkage of a particular resin may be decreased by the inclusion therein of an inert filler and in accordance with an aspect of the present invention the synthetic organic resin may include a finely divided inert filler preferably carbon black, furnace black or some other form of finely divided carbon. By this means the shrinkage of the synthetic resin may be decreased.

In accordance with a further aspect of the present invention the synthetic organic fibre may include a finely divided inert filler preferrably carbon black, furnace black or some other form of finely divided carbon.

The fibre/resin impregnate may be formed in a mould and advantageously in accordance with an aspect of the present invention the fibre may be tensioned during the moulding process.

There will now be described, by way of example only, a process for the production of a carbon article within the scope of the present invention, together with examples of the effect of varying the partial conversion treatment of the synthetic organic fibre upon the strength of the carbon article produced.

EXAMPLE 1

Polyacrylonitrile (Courtelle of filament denier 1½ containing 750 ends) partially converted by heating in air at a temperature of the order of 220° C for 5 hours while being restrained from shrinking was impregnated with a phenol/formaldehyde resin (CIBA Aerophen 0808), in a continuous process by passing a continuous tow of the oxidised polyacrylonitrile through a U-tube containing the resin and drawing it through a capillary tube die with a diameter of 500 microns. The draw rate was 20 cm hr$^{-1}$. The resin was cured by passing the impregnated tow through a furnace with a maximum temperature of 200° C, the residence time being about 3 hours. After curing of the resin the resin/fibre impregnate was cut into lengths which were placed in a furnace in an inert atmosphere at a temperature of 1000° C for 1 hour.

After curing, as described above the resin/fibre impregnate had a tensile strength of $19.7 \times 10^3$ psi and a diameter of 485 microns. After the carbonisation stage the fibres had tensile strength of $38.7 \times 10^3$ psi, a Young's modulus of $8.12 \times 10^6$ psi and a diameter of 360 microns.

EXAMPLE 2

The procedure of Example 1 was repeated using as starting material polyacrylonitrile, which had been heated at a temperature of 400° C in an inert atmosphere for 1 hour subsequent to heating in air. In this substance after curing as described above the resin/fibre impregnate had a tensile strength of $20.4 \times 10^3$ psi, a Young's modulus of $1.22 \times 10^6$ psi and a diameter of 403 microns. After the carbonisation stage the fibres had a tensile strength of $36.3 \times 10^3$ psi, a Young's Modulus of $10.3 \times 10^6$ psi and a diameter of 310 microns.

EXAMPLE 3

The procedure of Example 1 was repeated using as a starting material polyacrylonitrile, which had been heated at a temperature of 600° C in an inert atmosphere for 1 hour subsequent to heating in air. In this instance after curing as described above the resin/fibre impregnate had a tensile strength of $32.8 \times 10^3$ psi, a Young's modulus of $3.07 \times 10^6$ psi and a diameter of 385 microns. After the carbonisation stage the fibres had a tensile strength of $32.1 \times 10^3$ psi, a Young's modulus of $9.69 \times 10^6$ psi and a diameter of 310 microns.

Carbon articles may be produced similarly by use of other synthetic organic fibres, e.g. copolymers etc. of polyacrylonitrile as hereinbefore defined, and also by the use of other synthetic resins, e.g. polyvinylidene chloride, furane resins, e.g. polyfurfuryl alcohol, polyurethanes and Friedel Crafts resins (hereinbefore defined), either or both of the fibre or the resin may include a finely divided filler, e.g. finely divided carbon.

We claim:

1. A process for producing a carbon-fiber-reinforced carbon body, which comprises: first producing a composite body having a matrix of carbonizable cured resin in which fibers that are made from synthetic organic fibers by subjecting such fibers to a first heat treatment up to a first temperature in an oxidizing atmosphere while substantially preventing the fibers from shrinking longitudinally during that heat treatment, are incorporated, and then subjecting the said composite body to carbonizing heat treatment up to a second, higher temperature in the absence of oxygen to convert the resin of the matrix into carbonaceous material and carbonize the fibers that are incorporated in said matrix.

2. A process for the production of a carbon article in the form of a fibre or rod which includes the steps of (1) passing a continuous tow of polyacrylonitrile fibre which has previously been subjected to a heat treatment in an oxidising atmosphere at a temperature in the range 200° to 250° C while being at least substantially restrained from shrinking, through a liquid resin selected from the group consisting of phenol/formaldehyde resins, polyvinylidene chloride resin and polyfurfuryl alcohol resin to impregnate the oxidized fibre with the said resin, (2) drawing the resin/fibre impregnate through a die to form it into a fibre or rod shape, (3) passing the said formed impregnate through a furnace to cure said resin and (4) subjecting the cured resin/oxidized fibre impregnate to carbonisation at a temperature of at least about 1000° C to carbonize the oxidized resin and fiber, the tendency of the carbon article to crack being reduced by a reduction in the relative shrinkage between the oxidized fiber and resin impregnate as compared with the shrinkage that would result during carbonization of the resin impregnate relative to a carbonized fiber.

3. A process as claimed in claim 2, wherein the resin is a phenol/formaldehyde resin and is cured by passing through a furnace at 200° C.

4. A process as claimed in claim 2, wherein the resin is a phenol/formaldehyde resin and the die has a diameter of 100 to 500 microns.

5. A process for the production of a carbon article having a reduced tendency to crack which includes the steps of:
   1. impregnating with a carbonizable synthetic organic resin polyacrylonitrile fiber which is capable of being carbonized, the said polyacrylonitrile fiber having been previously subjected to an oxidizing heat treatment at a temperature of about 200° to 250° C in an oxidizing atmosphere while the fibre is at least substantially restrained from shrinkage;
   2. curing the synthetic organic resin; and
   3. heating the cured synthetic organic resin/oxidized fiber impregnate at a temperature of at least about 1000° C to carbonize the resin and the oxidized fiber, the tendency of the carbon article to crack being reduced by a reduction in the relative shrinkage between the oxidized fiber and the resin impregnate as compared with the shrinkage that would result during carbonization of the resin impregnate relative to a carbonized fiber.

6. A process as claimed in claim 5 wherein the carbonizable synthetic organic resin is selected from the group consisting of phenol/formaldehyde resin, polyvinylidene chloride resin and polyfurfuryl alcohol resin.

7. A process as claimed in claim 5 wherein the carbonizable synthetic organic resin includes finely divided carbon.

8. A process as claimed in claim 5 wherein the polyacrylonitrile fiber includes finely divided carbon.

9. A process for the production of a carbon article in the form of a fiber or rod which includes the steps of (1) impregnating with a carbonizable synthetic organic resin a continuous tow of polyacrylonitrile fiber which has previously been subjected to heat treatment at a temperature of about 200 to 250° C in an oxidizing atmosphere while the said polyacrylonitrile fiber is at least substantially restrained from shrinking, (2) forming the said synthetic organic resin/oxidized fiber impregnate into a fiber or rod, (3) curing the synthetic organic resin, and (4) subjecting the synthetic organic resin/oxidized fiber impregnate to carbonization at a temperature of at least about 1000° C to carbonize the fiber and the oxidized resin, the tendency of the carbon article to crack being reduced by a reduction in the relative shrinkage between the oxidized fiber and resin impregnate as compared with the shrinkage that would result during carbonization of the resin impregnate relative to a carbonized fiber.

10. A process as claimed in claim 9 wherein the synthetic organic resin is selected from the group consisting of phenol/formaldehyde resin, polyvinylidene chloride resin and polyfuryfuryl alcohol resin.

11. A process as claimed in claim 9 wherein the carbonizable synthetic organic resin/fiber impregnate is formed into a fiber or rod by drawing through a die.

12. A process as claimed in claim 11 wherein the die has a diameter of about 25 microns to about 1 mm.

* * * * *